(12) United States Patent
Fulford et al.

(10) Patent No.: US 7,342,052 B2
(45) Date of Patent: Mar. 11, 2008

(54) PROCESS FOR REGENERATION OF AN ELASTOMER FROM SCRAP

(75) Inventors: Roland Fulford, Quebec (CA); Daniel Martin, Quebec (CA); El Hadi Zaddi, Quebec (CA)

(73) Assignee: The Fulford Group Inc., Beloeil (CA)

( * ) Notice: Subject to any disclaimer, the term of this patent is extended or adjusted under 35 U.S.C. 154(b) by 473 days.

(21) Appl. No.: 10/771,334

(22) Filed: Feb. 5, 2004
(Under 37 CFR 1.47)

(65) Prior Publication Data

US 2004/0242711 A1    Dec. 2, 2004

Related U.S. Application Data

(63) Continuation-in-part of application No. PCT/CA02/01233, filed on Aug. 8, 2002.

(60) Provisional application No. 60/310,462, filed on Aug. 8, 2001.

(30) Foreign Application Priority Data

Aug. 8, 2002   (CA) .................... PCT/CA02/01233

(51) Int. Cl.
    *C08J 11/04*    (2006.01)
(52) U.S. Cl. .................. 521/41; 521/44.5; 521/45.5
(58) Field of Classification Search ................ 521/41, 521/44.5, 45.5
    See application file for complete search history.

(56) References Cited

U.S. PATENT DOCUMENTS

| 4,148,763 | A |   | 4/1979 | Bryson |
| 5,362,759 | A |   | 11/1994 | Hunt et al. |
| 5,883,140 | A | * | 3/1999 | Fisher et al. ............... 521/45.5 |
| 6,037,418 | A | * | 3/2000 | Mukai et al. ............... 525/242 |

FOREIGN PATENT DOCUMENTS

| CN | 1266865 A | 9/2000 |
| DE | 34 20 609 A | 12/1985 |
| EP | 1 038 909 A | 9/2000 |
| GB | 438 555 A | 11/1935 |

* cited by examiner

*Primary Examiner*—Edward J. Cain
(74) *Attorney, Agent, or Firm*—Bereskin & Parr

(57) ABSTRACT

The invention relates to a process for converting an elastomer from scrap to a regenerated elastomer which comprises the steps of: (a) introducing the elastomer from scrap into a vessel; (b) agitating the elastomer from scrap; (c) heating the elastomer from scrap to a temperature below a temperature where the elastomer begins to degrade; (d) introducing an oil into the vessel and admixing together the elastomer from scrap and the oil; and (e) cooling down the so formed regenerated elastomer, whereby the regenerated elastomer has properties similar to a corresponding virgin elastomer. Steps (b) and (c) are carried out simultaneously or separatelty and steps (c) and (d) are carried out simultaneously or separately. A regenerated elastomer and its use are also disclosed.

53 Claims, No Drawings

US 7,342,052 B2

PROCESS FOR REGENERATION OF AN ELASTOMER FROM SCRAP

This application is a Continuation-In-Part of copending PCT International Application No. PCT/CA02/01233 filed on Aug. 8, 2002, which designated the United States and on which priority is claimed under 35 U.S.C. § 120, and this application also claims priority of U.S. Provisional Application No. 60/310,462 filed on Aug. 8, 2001, under 35 U.S.C. § 119 (e), the entire contents of which are hereby incorporated by reference.

FIELD OF THE INVENTION

The present invention relates to improvements in the field of recycled elastomers. More particularly, the invention relates to a process for converting an elastomer from scrap to a regenerated elastomer.

BACKGROUND OF THE INVENTION

Recycling of elastomers in general and more particularly recycling of rubber constitute a major concern from a social and environmental view. As little progress in the production of high quality rubber products derived from vulcanized rubber has failed to meet the quality required by the industry, the current situation calls for the development of new technologies, to show the ability to expand a very demanding market by producing a larger number of high quality and competitive products derived form scrap rubber. This can be achieved if the recycled elastomer or rubber is processed with the same conventional processing methods as for virgin elastomer or rubber.

There are several major markets in use today for the recycling of elastomers from scrap, rubber from scarp, tire derived fuel, punched or stamped products from tire carcasses, mats and many low end applications using bonding technologies of the rubber particles. However, those issues that deal with reclaimed rubber derived from some chemical treatment of vulcanized rubber hold a promising alternative to a durable solutions. Various patented methods are claiming a successful chemical partial devulcanization of scrap rubber using a chemical treatment that involves thermal, mechanical energy or other form of energy such as ultra sonic. Devulcanization is defined as a reverse reaction of the sulfur carbon bonding. Unfortunately, large-scale commercial applications of those methods are prohibited either from an economical point of view or in regard to the poor properties of the products obtained from the processes proposed.

SUMMARY OF THE INVENTION

It is therefore an object of the invention to provide a process for converting an elastomer from scrap to a regenerated elastomer. It is another object of the present invention to provide a regenerated elastomer having properties similar to a corresponding virgin elastomer.

According to one aspect of the invention, there is provided a process for converting an elastomer from scrap to a regenerated elastomer which comprises the steps of:
  a) introducing the elastomer from scrap into a vessel;
  b) agitating the elastomer from scrap;
  c) heating the elastomer from scrap to a temperature below a temperature where the elastomer begins to degrade;
  d) introducing an oil into the vessel and admixing together the elastomer from scrap and the oil; and
  e) cooling down the so formed regenerated elastomer, whereby the regenerated elastomer has properties similar to a corresponding virgin elastomer.

Steps (b) and (c) are carried out simultaneously or separatelty and steps (c) and (d) are carried out simultaneously or separately.

According to a preferred embodiment of the invention, steps (c) and (d) are carried out simultaneously, and the oil is a preheated oil which heats the elastomer from scrap.

According to another aspect of the invention, there is provided a process for converting an elastomer from scrap to a regenerated elastomer which comprises the steps of:
  a) introducing the elastomer from scrap into a vessel equipped with agitating means, the elastomer from scrap being in a powder form;
  b) agitating and heating the elastomer from scrap to a temperature below a temperature where the elastomer begins to degrade;
  c) introducing an oil into the vessel and admixing together the elastomer from scrap and the oil; and
  d) cooling down the so formed regenerated elastomer, whereby the regenerated elastomer has properties similar to a corresponding virgin elastomer.

The term "elastomer" as used herein refers to crosslinked polymers having a structure forming a network where the chains of the polymers are joined together. It is used as a broader term than rubber since in many cases, synthetic rubbers may also comprise other additives such as filling agents and vulcanizing agents.

According to a further aspect of the invention, there is provided a regenerated elastomer obtained via the process of the invention or in any preferred embodiments thereof.

Applicant has found that by carrying out the process of the invention, it is possible to convert the elastomer from scrap to a regenerated elastomer and avoid its degradation. Also, applicant has found that by using such a process, the obtained regenerated elastomer is a slightly expanded and soft powder which is non-sticky and non-masticated or unmasticated. The regenerated elastomer does not soil hands by touch and has a characteristic velvet touch. Furthermore, the regenerated elastomer has properties similar to a corresponding virgin elastomer. During experiments, it was demonstrated that the regenerated elastomer is compatible with the corresponding virgin elastomer and it has a similar polymer value. Thus, in elastomer compounds or products, the regenerated elastomer could replace a portion of the virgin elastomer normally used without affecting the properties of the compound.

In the process of the invention, the vessel can be a vessel of the double boiler type. Preferably, the boiler comprises a mixing chamber and a heating chamber. Agitating means preferably comprises a rotor having at least one blade mounted on a central shaft. The agitation of the elastomer from scrap can be brought by rotating the agitating meansto generate shearing forces. Preferably, the rotor is rotated at a revolution comprised between 150 and 1200 rpm and more preferably comprised between 160 and 200 rpm. The elastomer from scrap can be converted to the regenerated elastomer in a period of time comprised between 30 seconds and 20 minutes, preferably comprised between 5 minutes and 15 minutes and more preferably of about 10 minutes.

The vessel used in the process of the invention is preferably a mixer and more preferably a thermokinetic mixer. The elastomer from scrap can be heated from the heat generated through thermokinetic energy produced by the agitation. The agitating means or agitator preferably comprises a shaft having angled cuts therein. The agitation of the elastomer from scrap can be brought by rotating the agitating means or agitator to generate shearing forces. The agitating means can be rotated at a revolution comprised between 1500 and 3000 rpm and preferably comprised between 1800 and 2000 rpm. The elastomer from scrap can be converted to the regenerated elastomer in a period of time comprised between 30 seconds and 5 minutes, preferably comprised between 30 seconds and 1 minute.

Vessel

In the process of the invention, the vessel can be equipped with a temperature control device comprising a heating system. The temperature control device can further comprise a cooling system.

Additional Steps

When the elastomer from scrap is heated and agitated prior to introduce the oil, the process of the invention can further comprise after step (b) and prior to step (c):

b') stopping the agitation and the agitation is started again in step (c), after the introduction of the oil into the vessel. The process can also further comprise after step (c) and prior to step (d):

c') ejecting the regenerated elastomer from the vessel.

Temperature

In the process according to the invention, the elastomer form scrap is preferably heated at a temperature $t_1$ comprised between 50 and 200° C., more preferably comprised between 140 and 170° C. and even more preferably at about 160° C. Alternatively, the temperature $t_1$ can be comprised between 160 and 190° C.

Particle Size

In the process of the invention, the powder can have a particle size of about 15 to about 200 mesh, preferably of about 20 to about 120 mesh and more preferably of about 80 to 100 mesh. The powder can also be constituted by at least 90% of particles having a size of at least 15 mesh and preferably of at least 30 mesh. The powder can further be constituted by at least 99% of particles having a size of at least 15 mesh and preferably of at least 30 mesh.

Agitation

In the process of the invention, the agitation is preferably carried out to avoid having stagnant particles of the elastomer in the vessel. The agitation can also be carried out to evenly heat the elastomer from scrap and therefore prevent its degradation. The agitation can be maintained during step (c) and preferably, also during step (d).

Oil

In the process according of the invention, the weight ratio, oil/elastomer from scrap, can be comprised between 0.03 and 0.2, preferably comprised between 0.04 and 0.14 and more preferably comprised between 0.05 and 0.09. Alternatively, the ratio can comprised between 0.0015 and 0.040 and preferably between 0.0175 and 0.0350. The oil is preferably preheated prior to admixing and preferably at a temperature $t_2$ being higher or equal to $t_1$. The temperature $t_2$ can also have a value comprised between $t_1$ and $t_1+60°$ C. and preferably comprised between $t_1+10$ and $t_1+40°$ C. Alternatively, the temperature $t_2$ can be comprised between 100 and 180° C.

The oil can be selected from the group consisting of synthetic oil, vegetable oil and mixtures thereof. The oil is preferably synthetic oil and more preferably selected from the group consisting of aromatic oil, naphtenic oil, paraffinic oil and mixtures thereof. When use is made of a paraffinic oil, the elastomer from scrap is preferably an ethylene propylene diene monomer rubber (EPDM). When use is made of an aromatic oil or a naphthenic oil, the elastomer from scrap is preferably a styrene butadiene rubber (SBR).

Cooling

In the process of the invention, in step (d), the regenerated elastomer can be kept in continuous motion in order to avoid degradation. Step (d) is preferably carried out using a screw type cooling device which preferably comprises a temperature control device. In step (d), the regenerated elastomer is preferably cooled down to a temperature below 120° C. and more preferably to a temperature comprised between 90 and 120° C., to prevent its degradation.

Experimental Conditions of the Process

The process of the invention can be carried out in the presence of air. The process can also be carried out under an inert gas atmosphere and the inert gas is preferably argon or nitrogen. Preferably, the gas atmosphere is substantially free of oxygen. Preferably, the risks of a potential side reaction such as oxidation are reduced.

Mass Recovered

In the process of the invention, the quantity of regenerated elastomer obtained at the end of the process corresponds to a yield comprised between 97.0 and 99.9% and preferably comprised between 98.5 and 99.5% of the combined weight of the elastomer from scrap and the oil introduced into the vessel.

The term "yield" as used herein refers only to the weight of the final product (regenerated elastomer) divided by the weight of the reactants (elastomer from scrap+oil). It does not consider completion of the chemical reaction and a 100% conversion is assumed.

Mastication

In the process of the invention, preferably, no mastication of the elastomer from scrap or of the regenerated elastomer occurs.

Rubber

The elastomer, in the process of the invention, is preferably a rubber. The rubber can comprise an ethylene propylene diene monomer rubber (EPDM) or a styrene butadiene rubber (SBR).

Regenerated Elastomer

The regenerated elastomer of the invention is preferably in a black powder form and more preferably the regenerated elastomer has an aspect of expanded black powder. Preferably, the regenerated elastomer is an unmasticated elastomer and does not retain moisture. The regenerated elastomer can have a velvet touch and is preferably non-sticky. Preferably, The regenerated elastomer does not soil hands by touch. The regenerated elastomer preferably comprises a quantity of oil comprised between 3 and 14% by weight, the oil being impregnated into the regenerated elastomer. More preferably, the quantity of said oil is comprised between 5 to 8% by weight. Alternatively, the quantity of oil can be comprised between 0.5 and 15% and preferably between 1 and 4% by weight Also, the regenerated elastomer preferably does not retain moisture. The regenerated elastomer can exhibit all the required characteristics needed for processing by using the methods of mixing, molding, extrusion and calendering, commonly used in the rubber industry. The regenerated elastomer can be effective in the composition of a product selected from the group consisting of gasket, hose and roofing. Also, the regenerated elastomer can be effective in the composition of hoses and car tires.

Utilisation of the Regenerated Elastomer

The regenerated elastomer of the invention can be used in the rubber industry. Preferably, the regenerated elastomer is, previously to its use in the rubber industry, prepared by a process selected from the group consisting of mixing, molding, extrusion, and calendering. The regenerated elastomer can be added with additives commonly used in the preparation of native rubber, previously to its use in the rubber industry. The regenerated elastomer can also be used in the composition of a product of the automobile industry or the snowmobile industry. More particularly, the regenerated elastomer can be used in the composition of a snowmobile track. The composition preferably comprises between 1 and 40% by weight and more preferably between 25 and 35% by weight of said regenerated elastomer. It is also possible to use the regenerated in the fabrication of a hose, a gasket or a seal. The hose, the gasket or the seal preferably comprise between 1 and 40% by weight and more preferably between 25 and 35% by weight of said regenerated elastomer. The elastomer is preferably a rubber.

DETAILED DESCRIPTION OF THE PREFERRED EMBODIMENTS

Experimental Section

The following non-limiting methods and compounds illustrate the invention.

General Procedures

The Applicant has prepared regenerated rubber according to three main procedures, Protocol A, B and C. Prior to treating the rubber from scrap according to any one of these protocols, all the undesired components contained in the powder (steel, fibers, general dirt) have been removed. The experimental conditions investigated in the present work are in accordance with the definitions given in the claims.

Protocol A

A weighted quantity of scrap rubber from scrap tires in the form of a granulated powder, having a given size of 80, 100 or 120 mesh, was introduced into a vessel of the double boiler type having a volume of 8 US gallons. The vessel is equipped with agitation means comprising a rotor having three blades mounted on a central shaft and is capable of generating shearing forces. The rotor blades were adequately designed and the agitation is carried out to avoid having stagnant particles of rubber in the vessel. Thus, all rubber powder was uniformly subjected to the combination of the thermal and mechanical energies. The rotor speed was set based on the quantity, type and granulometry of the rubber powder introduced into the vessel and at a sufficient level to generate shearing forces. The powder was heated for 5 minutes until it reached a temperature comprised between 140° C. and 160° C. A tightly controlled temperature was necessary during the process in order to prevent any damage to the powder in the form of degradation. When all the particles have reached the required temperature, a hot oil (aromatic oil, naphtenic oil or paraffinic oil ) having a temperature of about 190 to 200° C. was added in a weight ratio, oil/rubber from scrap, comprised between 0.05 and 0.12. The ratio depends on the nature and the granulometry of the powder as well as on the type of oil selected and its temperature. The mixture was kept under agitation for a period of time of about 5 minutes to allow the completion of the reaction. The regenerated rubber was ejected of the vessel and cooled down. It is preferable to keep the regenerated rubber in continuous motion while cooling, in order to avoid degradation of the regenerated rubber. The regenerated rubber was, in some cases, cooled down using a screw type cooling device. The obtained regenerated rubber was slightly expanded, not oily, unmasticated, and non-sticky or non-tacky. It also had a characteristic velvet touch.

Protocol B

A weighted quantity of scrap rubber from scrap tires in the form of a granulated powder, having a given size of 80, 100 or 120 mesh, was introduced into a vessel of the thermokinetic mixer type having a volume of 1 litter. The thermokinetic mixer was a modified version of a GELIMAT™ mixer. The mixer is equipped with a temperature control system comprising a cooling jacket and with agitation means comprising a rotor having blades mounted on a central shaft and is capable of generating high shearing forces. The thermokinetic energy generated by the agitation produce heat and the elastomer from scrap is thereby heated. The rotor blades were adequately designed and the agitation is carried out to avoid having stagnant particles of rubber in the vessel. Thus, all rubber powder was uniformly subjected to the combination of the thermal and mechanical energies. The rotor speed was set based on the quantity, type and granulometry of the rubber powder introduced into the vessel and at a sufficient level to generate high shearing forces. The powder was vigorously agitated for 30 seconds until it reached a temperature comprised between 140° C. and 160° C. A tightly controlled temperature was necessary during the process in order to prevent any damage to the powder in the form of degradation. When all the particles have reached the required temperature, a hot oil (aromatic oil, naphtenic oil or paraffinic oil ) having a temperature of about 190 to 200° C. was added in a weight ratio, oil/rubber from scrap, comprised between 0.05 and 0.12. The ratio depends on the nature and the granulometry of the powder as well as on the type of oil selected and its temperature. The mixture was kept under agitation for a period of time of about 30 seconds to allow the completion of the reaction. The regenerated rubber was ejected of the vessel and cooled down. It is preferable to keep the regenerated rubber in continuous motion while cooling, in order to avoid degradation of the regenerated rubber. The regenerated rubber was, in some cases, cooled down using a screw type cooling device. The obtained regenerated rubber was slightly expanded, not oily, unmasticated, and non-sticky or non-tacky. It also had a characteristic velvet touch.

Protocol C

A weighted quantity of scrap rubber from scrap tires in the form of a granulated powder, having a given size about 35 mesh, was introduced into a vessel of the thermokinetic mixer type having a volume of 250 litters. The mixer is equipped with a temperature control system comprising a cooling jacket and with agitation means or agitator comprising a central shaft having angled cuts therein. This mixer is capable of generating high shearing forces. The admixing of the rubber and the oil is carried out by rotating the agitation means so as to generate shearing forces, whereby heating the rubber and the oil. In fact, the thermokinetic energy generated by the agitation produce heat and the mixture of rubber and oil is thereby heated. The agitator was adequately designed and the agitation is carried out to avoid having stagnant particles of rubber in the vessel. Thus, all rubber powder was introduced in the vessel and agitated by rotating the agitator at about 400 to about 800 rpm. Then, a preheated synthetic oil having a temperature of about 100 to about 180° C. has been introduced into the vessel and the mixture of oil and rubber has been subjected to a vigorous agitation. The weight ratio, oil/rubber from scrap, was about 0.0175 to about 0.0350. The ratio depends on the nature and the granulometry of the powder as well as on the type of oil selected and its temperature. The rubber was subjected to the combination of the thermal and mechanical energies. The agitator speed was set based on the quantity, type and granulometry of the rubber powder introduced into the vessel and at a sufficient level to generate high shearing forces. The agitator speed was about 2500 to about 3000 rpm. The powder was vigorously agitated for 30 to 45 seconds to allow the completion of the reaction. The heating was limited to a temperature comprised between 160° C. and 190° C. A tightly controlled temperature was necessary during the process in order to prevent any damage to the powder in the form of degradation. The obtained regenerated rubber was ejected of the vessel and cooled down. It is preferable to keep the regenerated rubber in continuous motion while cooling, in order to avoid degradation of the regenerated rubber. The regenerated rubber was, in some cases, cooled down using a screw type cooling device. The obtained regenerated rubber was slightly expanded, not oily, unmasticated, and non-sticky or non-tacky. It also had a characteristic velvet touch.

Chemical and Physical Properties of the Regenerated Rubber

Laboratory tests revealed the presence of small amounts of free sulfur in the process of regenerating rubber that establishes that devulcanization has effectively taken place during the reaction using the process according to the present invention.

The tests conducted for testing the recycling ability of the rubbery mass obtained according to the process of the invention consist of using the following formulation:

| regenerated rubber | 100 phr |
| zinc oxide | 4 phr |
| stearic acid | 2 phr |
| Delac ® S | 1 phr |

With no sulfur added into the compound, a rheometer test carried out with a ViscoGraph from TechPro at a temperature of 150° C., shows the typical curve of vulcanization. This is the evidence that some amount of free sulfur has effectively been released during the chemical treatment of the rubber particles. The devulcanization has involved the breakage of the C—S and S—S bonds that link the different rubber molecules. The devulcanization process is believed to be facilitated by the swelling action of the oil added into the rubber particles.

In addition, breakage of the main backbone chains at some locations is also believed to take place as the green strength and the mechanical properties of the regenerated mass are poorer than those of a virgin rubber of the same type as evidenced by tensile, elongation and tear properties.

Other tests have been performed to determine the quantity of oil lost during the process of the invention. The weight of the reactants, rubber from scrap+oil, has been compared to the weight of the final product, the regenerated rubber, when using Protocol A. In a first experiment, a Goodyear 80 mesh EPDM from scarp was heated during 5 minutes until it reached the temperature of 152° C. Then a Shellflex oil at 199° C. was added in a weight ratio, oil/elastomer from scrap, of 0.08. The mixing time was 5 minutes. At the end of the process, the regenerated EPDM was obtained indicating a potential lost of oil of 0.6%.

In a second experiment, a ROUSE 120 mesh EPDM from scarp was heated during 5 minutes until it reached the temperature of 153° C. Then a Shellflex oil at 200° C. was added in a weight ratio, oil/elastomer from scrap, of 0.08. The mixing time was 5 minutes. At the end of the process, the regenerated EPDM was obtained indicating a potential lost of oil of 0.9%.

In a third experiment, a SIMCO 100 mesh EPDM from scarp was heated during 5 minutes until it reached the temperature of 160° C. Then a Shellflex oil at 200° C. was added in a weight ratio, oil/elastomer from scrap, of 0.08. The mixing time was 5 minutes. At the end of the process, the regenerated EPDM was obtained indicating a potential lost of oil of 1.3%.

Physical Characterisation and Analysis of Compounds Comprising Regenerated Rubber The processing abilities and the mechanical properties have been evaluated by designing compounds based on the regenerated rubber. Basic compounds comprising regenerated rubber and virgin rubber at various proportions have been designed as shown below in Table 1.

TABLE 1

Composition of Compounds 1 to 4 comprising virgin SBR and regenerated SBR.

| Components | Compound 1 composition (%) | Compound 2 composition (%) | Compound 3 composition (%) | Compound 4 composition (%) |
| --- | --- | --- | --- | --- |
| Regenerated SBR | 25 | 50 | 75 | 100 |
| SBR 1502 | 75 | 50 | 25 | 0 |
| Carbon black N330 | 20 | 20 | 20 | 20 |
| Zinc oxide | 4 | 4 | 4 | 4 |
| Stearic acid | 2 | 2 | 2 | 2 |
| Delac NS | 1.5 | 1.5 | 1.5 | 1.5 |
| Sulfur | 1.5 | 1.5 | 1.5 | 1.5 |

The mixing operations were carried out in a 5-liter Banbury mixer. All ingredients were added in the order listed above on a one-stage basis.

The mechanical properties of the cured compounds were evaluated with a tensile testing machine. Dumbbell shaped samples were die cut out of compression molded sheets. The curing conditions in the compression press were 10 minutes at 180° C. The tensile properties and tear resistance were measured and compared to those of a compound based on virgin SBR rubber. The results are displayed in Table 2 for compounds containing 25, 50, 75 and 100 phr of regenerated rubber.

TABLE 2

Mechanical properties of Compounds 1 to 4.

| Compounds | Concentration of regenerated rubber (phr) | Tensile Resistance psi | Elongation % | Tear Resistance Lb-ft | Hardness Shore A |
|---|---|---|---|---|---|
| Compound 4 | 100 | 711 | 78 | 79 | 75 |
| Compound 3 | 75 | 1204 | 236 | 167 | 71 |
| Compound 2 | 50 | 1678 | 456 | 239 | 62 |
| Compound 1 | 25 | 1858 | 563 | 275 | 56 |

Further investigation on the effect of the parameters listed below on the mechanical properties of the regenerated rubber based compounds were evaluated.

The results are listed in tables 3.1 to 3.3.

3.1 Effects of Conversion Time on the Mechanical Properties

| # COMPOUND | Time (min) | TENSILE (psi) | Elongation % | MOD 100% (psi) | MOD 200% | MOD 300% | TEAR Die C |
|---|---|---|---|---|---|---|---|
| 2 | 4 | 1029.8 | 338.1 | 309.7 | 652.7 | 963.3 | 189.8 |
| 3 | 6 | 1026.1 | 395.4 | 326.8 | 593.1 | 853 | 207.2 |
| 2 | 10 | 1678.5 | 456.6 | 359.4 | 723.2 | 1124.1 | 239 |
| 4 | 14 | 817.3 | 371.6 | 301.2 | 534.9 | 721.8 | 188.6 |

3.2 Effect of the Percentage of Recycled Rubber on the Mechanical Properties

| # COMPOUND | % recycled | HARDNESS Duro A | TENSILE (psi) | ELONGATION % | MOD 100% | MOD 200% | MOD 300% | TEAR Die C |
|---|---|---|---|---|---|---|---|---|
| 1 | 25 | 55 | 1858.6 | 563.8 | 229.4 | 450.7 | 779 | 275.4 |
| 2 | 50 | 62 | 1678.5 | 456.6 | 359.4 | 723.2 | 1124.1 | 239 |
| 3 | 75 | 71 | 1204 | 236 | 600 | 1071 | | 167.1 |
| 4 | 100 | 75 | 711.6 | 78.4 | | | | 79 |

3.3 Effect of the Conversion Temperature on the Mechanical Properties

| # COMPOUND | TEMPERATURE ° C. | TENSILE (psi) | ELONGATION % | MOD 100% | MOD 200% | MOD 300% | TEAR Die C |
|---|---|---|---|---|---|---|---|
| 1 | 160 | 1378 | 275 | 355.9 | 966.1 | | 199.9 |
| 2 | 170 | 1307.7 | 355.2 | 355.2 | 272.7 | 1131.7 | 198.6 |
| 3 | 180 | 1056.1 | 355.8 | 271 | 597.5 | 938 | 162.3 |
| 4 | 200 | 1678.5 | 456.6 | 359.4 | 723.2 | 1124.1 | 239 |

TABLE 4

Rheometer 191 C test for Compounds 5 and 6

| PROPERTIES | Compound 5 | Compound 6 |
|---|---|---|
| Minutes | 5.1 | 5.3 |
| T rise | 1.20 | 1.20 |
| T25 | 1.48 | 1.43 |
| S25 | 8.4 | 7.4 |
| T90 | 2.33 | 3.38 |
| S90 | 17.7 | 12.9 |
| Max | 19.1 | 13.8 |
| Rate | 10.93 | 2.86 |
| AMT | 14.0 | 8.5 |

Compounds 5 and 6 are both compounds comprising virgin SBR and regenerated SBR. The Compound 5 comprises 25% by weight of regenerated SBR and compound 6 comprises 30% by weight of regenerated SBR. The regenerated SBR has been obtained according to Protocol A using 80 mesh SBR form scrap and Shellflex oil as starting material. Tables 4 to 6 illustrate results obtained with these compounds during several tests.

TABLE 5

Scortch 121 C test for Compounds 5 and 6

| PROPERTIES | Compound 5 | Compound 6 |
|---|---|---|
| INITIAL | 33.6 | 35.8 |
| MIN | 18.9 | 19.6 |
| T3 | >20 | >20 |

TABLE 6

Physical properties of Compounds 5 and 6

| PROPERTIES | Compound 5 | Compound 6 |
|---|---|---|
| Tensile ultim. (psi) | 1081 | 886 |
| Modulus 100% | 302 | 207 |
| 200% | 547 | 378 |
| 300% | 789 | 562 |
| Elongation % | 480.1 | 563 |
| Hardness | 65 | 62 |
| Specific gravity | 1.35 | 1.33 |

According to the following tables, Compounds 5 and 6 are acceptable for use in hose construction. No difficulties were encountered when applying Compounds 5 and 6 on a mandrel. The hose tube and cover surfaces appeared smooth and not granulated. The processing of Compound 5 on the mill and calender was achieved with success. The compounds were not sticky and they did not break down in crumbs. The surface of these compounds was smooth and showed no evidence of surface defects. The surface was similar to standard product.

Compounds 7, 8 and 9 are compounds comprising virgin EPDM and regenerated EPDM. Compound 7 comprises 20% by weight of regenerated EPDM, Compound 8 comprises 30% by weight of regenerated EPDM and Compound 9 comprises 40% by weight of regenerated EPDM. The regenerated EPDM has been obtained according to Protocol A using 80 mesh EPDM form scrap and Sunpar 2280 oil as starting material. Tables 7 to 9 illustrate results obtained with these compounds during several tests.

TABLE 7

Rheometer 191 C test for Compounds 7, 8, and 9

| Properties | Compound 7 | Compound 8 | Compound 9 |
|---|---|---|---|
| Min | 4.8 | 4.8 | 5.2 |
| T rise | 0.99 | 0.98 | 0.97 |
| T25 | 1.30 | 1.27 | 1.23 |
| S25 | 9.2 | 9.1 | 9.2 |
| T90 | 2.00 | 1.91 | 1.85 |
| S90 | 21.4 | 20.8 | 20.4 |
| Max | 23.2 | 22.5 | 22.1 |
| Rate | 17.31 | 18.22 | 18.05 |
| AMT | 18.4 | 17.7 | 16.9 |

TABLE 8

Scortch 121 C test for Compounds 7, 8, and 9

| PROPERTIES | Compound 7 | Compound 8 | Compound 9 |
|---|---|---|---|
| INITIAL | 24.9 | 24.8 | 28.3 |
| MIN | 19.2 | 19.1 | 20 |
| T3 | >20 | >20 | >20 |

TABLE 9

Physical properties of Compounds 7, 8, and 9

| PROPERTIES | Compound 7 | Compound 8 | Compound 9 |
|---|---|---|---|
| Tensile ultim. (psi) | 1109 | 1074 | 1035 |
| Modulus 100% | 348 | 350 | 350 |
| 200% | 625 | 630 | 620 |
| 300% | 832 | 838 | 831 |
| Elongation % | 539 | 518 | 493 |
| Hardness | 75 | 75 | 77 |
| Specific gravity | 1.23 | 1.23 | 1.22 |

According to the following tables, Compounds 7, 8 and 9 are acceptable for use in hose construction. No difficulties were encountered when applying these compounds on a mandrel. The hose tube and cover surfaces appeared smooth and not granulated. The processing of Compound 8 on the calender was achieved with success, it showed good tack on rolls, a smooth surface and it accepts anti-tack-dust. The surface of these compounds was smooth and showed no evidence of surface defects.

Tests have also been made in order to verify if it was necessary to add sulfur and accelerator to EPDM compounds comprising virgin EPDM and regenerated EPDM. The regenerated EPDM has been obtained according to Protocol A using 80 mesh EPDM form scrap and Sunpar 2280 oil as starting material. Compounds 10 to 21 are EPDM compounds comprising from 2.4 to 6.7% of regenerated EPDM rubber and having a polymer content (EPDM) varying from 10 to 30%. Compounds 10, 11, 16 and 17 comprise about 2.4% of regenerated EPDM and have a polymer content of about 10%. Compounds 12, 13, 14, 18, 19 and 20 comprise about 4.8% of regenerated EPDM and have a polymer content of about 20%. Compounds 15 and 21 comprise about 6.7 of regenerated EPDM and have a polymer content of about 30%. Compounds 10 to 15 have been prepared using 100 mesh regenerated EPDM and Compounds 16 to 21 have been prepared using 120 mesh regenerated EPDM. The results of these tests are showed in Tables 10 to 15. Cont represents a compound comprising virgin EPDM only and having a polymer content of about 23%.

Virgin EPDM rubber compound was banded on a 20 cm×50 cm two-roll laboratory mill and the regenerated rubber was mixed in to it. Total milling time was about 10 minutes. The virgin material was passed through the mill 10 times with the gap narrowing after each two passes then banded and the regenerated material added. When the regenerated material was dispensed additional sulfur or curatives was added at this point. When all was dispersed the rubber was then pigged and passed through the mill 10 times sheeting it out on the last pass at approximately 100 thou in thickness.

Rheometer traces were obtained on an ODR at 150° C., test plaques cured to ($t_{80}$+5 minutes at 150° C.). After 24 hours specimens were die cut and tested using an Instron tensile tester.

TABLE 10

Composition of Compounds 10 to 15 comprising 100 mesh regenerated EPDM

| | Cont | 10 | 11 | 12 | 13 | 14 | 15 |
|---|---|---|---|---|---|---|---|
| Virgin EPDM | 500.0 | 500.0 | 500.0 | 500.0 | 500.0 | 500.0 | 500.0 |
| Regenerated | — | 12.0 | 12.0 | 24.0 | 24.0 | 24.0 | 36.0 |
| MBTS | — | — | — | — | — | 0.23 | 0.23 |
| TMTD | — | — | — | — | — | 0.35 | 0.35 |
| Sulfur | — | — | 0.3 | — | 0.3 | 0.23 | 0.23 |

TABLE 11

Rheometer data at 150° C. for Compounds 10 to 15

|  | Cont | 10 | 11 | 12 | 13 | 14 | 15 |
|---|---|---|---|---|---|---|---|
| Min. torque | 4.0 | 4.1 | 4.1 | 5.1 | 4.7 | 5.8 | 5.3 |
| Max. torque | 40.3 | 38.7 | 43.6 | 40.3 | 44.9 | 47.5 | 46.9 |
| Time to 2 pt. rise, | 5.0 | 4.3 | 3.8 | 4.0 | 3.8 | 3.8 | 3.8 |
| Time to 90% cure, | 19.0 | 19.5 | 24.6 | 20.3 | 21.5 | 22.0 | 23.0 |

TABLE 12

Vulcanizate properties for Compounds 10 to 15 cured at 150° C.

|  | Cont | 10 | 11 | 12 | 13 | 14 | 15 |
|---|---|---|---|---|---|---|---|
| Hardness, Shore A | 64 | 66 | 70 | 67 | 70 | 70 | 73 |
| Modulus, psi 100% | 285 | 330 | 360 | 350 | 350 | 380 | 395 |
| 200% | 525 | 640 | 710 | 660 | 675 | 710 | 710 |
| 300% | 675 | 905 | 940 | 855 | 880 | 900 | 905 |
| Tensile Strength, psi | 990 | 1070 | 1165 | 1060 | 1110 | 1110 | 1110 |
| Elongation at break, % | 585 | 525 | 470 | 495 | 460 | 450 | 445 |
| Tear Str., Die C, pli | 227 | 252 | 195 | 230 | 197 | 221 | 215 |
| Cure time, min | 24 | 24.5 | 29.0 | 25.3 | 26.5 | 27.0 | 28.0 |

TABLE 13

Composition of Compounds 16 to 21 comprising 120 mesh regenerated EPDM

|  | Cont | 16 | 17 | 18 | 19 | 20 | 21 |
|---|---|---|---|---|---|---|---|
| Virgin EPDM | 500.0 | 500.0 | 500.0 | 500.0 | 500.0 | 500.0 | 500.0 |
| Regenerated | — | 12.0 | 12.0 | 24.0 | 24.0 | 24.0 | 36.0 |
| MBTS | — | — | — | — | — | 0.23 | 0.23 |
| TMTD | — | — | — | — | — | 0.35 | 0.35 |
| Sulfur | — | — | 0.3 | — | 0.3 | 0.23 | 0.23 |

TABLE 14

Rheometer data at 150° C. for Compounds 16 to 21

|  | Cont | 16 | 17 | 18 | 19 | 20 | 21 |
|---|---|---|---|---|---|---|---|
| Min. torque | 4.0 | 4.8 | 5.0 | 5.0 | 6.0 | 5.5 | 6.0 |
| Max. torque | 40.3 | 39.9 | 44.3 | 40.0 | 44.8 | 43.1 | 42.6 |
| Time to 2 pt. rise, | 5.0 | 4.8 | 4.3 | 4.5 | 4.0 | 4.0 | 4.0 |
| Time to 90% cure, | 19.0 | 19.0 | 21.5 | 20.5 | 18.5 | 16.8 | 15.8 |

TABLE 15

Vulcanizate properties for Compounds 16 to 21 cured at 150° C.

|  | Cont | 16 | 17 | 18 | 19 | 20 | 21 |
|---|---|---|---|---|---|---|---|
| Cure time, min | 24 | 24.0 | 26.5 | 25.5 | 23.5 | 21.8 | 20.8 |
| Hardness, Shore A | 64 | 68 | 71 | 67 | 70 | 68 | 70 |
| Modulus, psi 100% | 285 | 310 | 352 | 325 | 335 | 355 | 340 |
| 200% | 525 | 630 | 665 | 595 | 630 | 665 | 635 |
| 300% | 675 | 825 | 855 | 775 | 820 | 855 | 825 |
| Tensile Strength, psi | 990 | 1090 | 1130 | 1015 | 1100 | 1090 | 1045 |
| Elongation at break, % | 585 | 550 | 495 | 565 | 495 | 500 | 485 |
| Tear Str., Die C pli | 227 | 241 | 195 | 229 | 195 | 225 | 227 | little change in viscosity, a slight drop in maximum torque and a slower cure rate. There was however a reduction in scorch safety. When additional sulfur was added, the maximum torque increased, cure rate and scorch safety decreased (Compound 11).

With the additional of the regenerated rubber itself, Compound 10, the hardness increased slightly; modulus, tensile strength and resistance to tearing increased while the elongation decreased but was still acceptable. Upon the addition of sulfur, in Compound 11, hardness and modulus increased further and tensile changed little, elongation decreased further, which then became less than the desired value and tear decreased. The scorch time decreased further as did the cure rate but in all cases was slower than the virgin compound.

Increasing the polymer content to 20% (Compound 12) the viscosity and maximum torque increased, scorch safety decreased and cure rate slowed (Compound 12 vs 10). The differences in property values were minor except hardness. However the elongation became marginally lower than desired but tear strength remained good. Additional sulfur produced only minor changes except for elongation and tear strength (Compound 13 vs. 12). Adding sulfur and accelerator produced minor changes (Compound 14 vs. 13) except tear became higher again. Compound 14 also had the highest viscosity and rheometer torque. Increasing the level to 30% (Compound 15) did little except reduce elongation and increase hardness. The elongation is now well below the desired level.

In Tables 13 to 15, the trends of, both rheological and physical properties, are more or less the same as the results of Tables 10 to 12 although the scorch time did not decrease as much and cure time was a little faster. Property values were quite similar. Modulus was slightly lower and elongation higher.

From Tables 10 to 12, it can be seen that when the polymer content was about 10% (Compound 10) there was In view of the results of Tables 10 to 15, it does not appear overly necessary to add additional sulfur and accelerator to the compounds comprising virgin EPDM and regenerated EPDM. When adding these components, there is a reduction in scorch safety and elongation. Also with nothing else added but the regenerated material, the property values appear to be sufficient. The difference between nothing added and additional curatives is not all that large. In the presence of regenerated 120 mesh material, the properties appear to be slightly better than the 100 mesh material i.e. elongation and tear are better. The regenerated EPDM mixed well into the virgin EPDM and sheeted out well. Upon curing, the surface of regenerated EPDM is shiny and did not differ from the virgin.

Compounds 22 and 23 are SBR rubbers comprising virgin SBR and regenerated SBR. Compound A, used as a reference, comprises 173.89 of a virgin SBR. Compound 22 comprises 173.89 of a virgin SBR, 45 phr of a regenerated SBR and 10 phr of carbon black. Compound 23 comprises 173.89 of a virgin SBR, 45 phr of a regenerated SBR and 20 phr of carbon black. The regenerated SBR has been obtained using the process according to the Protocol A. The regenerated SBR has been obtained using 80 mesh SBR from scrap and naphtenic oil. The tests made on these compounds are illustrated in Table 16.

TABLE 16

Tests of Compounds 22 and 23

| Property | Units | Compound A | Compound 22 | Compound 23 |
| --- | --- | --- | --- | --- |
| Cure properties | | | | |
| Max. torque | lb-in | 67-87 | 50.00 | 59.52 |
| Min. torque | lb-in | 10-18 | 14.99 | 19.03 |
| Ts(2) | min | 0.90-1.18 | 1.01 | 0.88 |
| Tc(80) | min | 1.80-2.50 | 1.83 | 1.60 |
| Viscosity | | | | |
| MLI + 4(100° C.) | mooney | 58-78 | 75.91 | 104.41 |
| Physical properties | | | | |
| Tensile | PSI | 2700 min. | 2246 | 2026 |
| Elongation at break | % | 308-438 | 345 | 298 |
| Stress at 300% strain | PSI | 2270-2950 | 2033 | 1996 |
| Hardness | Shore A | 79-87 | 82 | 84 |
| Tear resistance die C | lbs/in | 200 min | 290 | 289 |
| Abrasion resistance | mm³ | 101 (typical) | 87 | 103 |
| Flex life de Mattia | kilocycle | 11 (typical) | 13 | 11 |

The cure properties for Compound 22 are very similar to Compound A Compound 22 even seems to cure slightly faster but with the same scorch safety. At lower temperatures the cure differences are amplified. At 166° C. Compound 22's Tc (80) is 5.41 minutes where Compound A's is around 7.5 minutes. Compound 22's viscosity is very interesting and should process well at the extruder. The physical properties demonstrated that Compound 22 should perform as well as a virgin SBR since it has similar properties than SBR. During experiments, it was demonstrated that the regenerated elastomer is compatible with the corresponding virgin elastomer and it has a similar polymer value. Thus, in elastomer compounds, the regenerated elastomer could replace a portion of the virgin elastomer normally used without affecting the properties of the compound. Finally, it proves the efficiency of the process of the invention.

The invention claimed is:

1. A process for converting an elastomer from scrap to a regenerated elastomer which comprises the steps of:
   a) introducing the elastomer from scrap into a vessel;
   b) agitating the elastomer from scrap;
   c) heating the elastomer from scrap to a temperature below a temperature where the elastomer begins to degrade;
   d) introducing an oil into said vessel and admixing together the elastomer from scrap and the oil; and
   e) cooling down the so formed regenerated elastomer, whereby the regenerated elastomer has properties similar to a corresponding virgin elastomer,
   said steps (b) and (c) being carried out simultaneously or separately and, said steps (c) and (d) being carried out simultaneously, and said oil being a preheated oil which heats said elastomer from scrap.

2. A process according to claim 1, wherein the admixing of said elastomer from scrap and said oil is carried out by rotating said agitation means to generate shearing forces, whereby heating said elastomer from scrap and said oil.

3. A process according to claim 2, wherein the agitation means is rotated at a revolution comprised between 1500 and 3000 rpm.

4. A process according to claim 1, wherein steps (b) and (c) are carried out simultaneously.

5. A process according to claim 1, wherein said elastomer from scrap is heated at a temperature $t_1$ comprised between 50 and 200° C.

6. A process according to claim 5, wherein said oil is preheated, prior to admixing, at a temperature $t_2$ being higher or equal to $t_1$.

7. A process according to claim 1, wherein said elastomer from scrap is heated at a temperature $t_1$ comprised between 160 and 190° C.

8. A process according to claim 1, wherein said oil is preheated, prior to admixing, at a temperature $t_2$ of about 100 to 180° C.

9. A process according to claim 1, wherein the elastomer from scrap is in a powder form, said powder being constituted by at least 90% of particles having a size of at least 15 mesh.

10. A process according to claim 9, wherein said particles have a size of at least 30 mesh.

11. A process according to claim 1, wherein agitation in step (b) is carried out by rotating agitation means at a revolution comprised between 400 and 800 rpm.

12. A process according to claim 1, wherein said elastomer from scrap is converted to said regenerated elastomer in a period of time comprised between 30 seconds and 60 seconds.

13. A process according to claim 1, wherein said process has a weight ratio, oil/elastomer from scrap, comprised between 0.015 and 0.040.

14. A process according to claim 13, wherein said ratio is comprised between 0.0175 and 0.0350.

15. A process according to claim 1, wherein the elastomer is a rubber.

16. A process according to claim 15, wherein said rubber comprises an ethylene propylene diene monomer rubber or a styrene butadiene rubber.

17. A process according to claim 1, wherein said oil is selected from the group consisting of synthetic oil, vegetable oil and mixtures thereof.

18. A process according to claim 17, wherein said oil is a synthetic oil selected from the group consisting of aromatic oil, naphtenic oil, paraffinic oil and mixtures thereof.

19. A process for converting an elastomer from scrap to a regenerated elastomer which comprises the steps of:
 a) introducing the elastomer from scrap into a vessel equipped with agitating means, said elastomer from scrap being in a powder form;
 b) agitating and heating said elastomer from scrap to a temperature below a temperature where the elastomer begins to degrade;
 c) introducing an oil into said vessel and admixing together the elastomer from scrap and the oil; and
 d) cooling down the so formed regenerated elastomer, whereby the regenerated elastomer has properties similar to a corresponding virgin elastomer,
wherein said oil is preheated prior to admixing.

20. A process according to claim 19, wherein the agitation means is rotated at a revolution comprised between 150 and 1200 rpm.

21. A process according to claim 19, wherein said agitating means comprises a rotor having at least one blade mounted on a central shaft.

22. A process according to claim 19, wherein admixing of said elastomer from scrap and said oil is carried out by rotating said agitation means so as to generate shearing forces.

23. A process according to claim 22, wherein said elastomer from scrap is heated from heat generated by the agitation generating shearing forces.

24. A process according to claim 22, wherein the agitation means is rotated at a revolution comprised between 1500 and 3000 rpm.

25. A process according to claim 19, wherein said elastomer from scrap is converted to said regenerated elastomer in a period of time comprised between 30 seconds and 20 minutes.

26. A process according to claim 25, wherein said period of time is comprised between 45 seconds and 3 minutes.

27. A process according to claim 26, wherein said elastomer from scrap is heated at a temperature $t_1$ comprised between 50 and 200° C.

28. A process according to claim 27, wherein said temperature $t_1$ is comprised between 140 and 170° C.

29. A process according to claim 19, wherein said powder has a particle size of about 15 to about 200 mesh.

30. A process according to claim 29, wherein said particle size is about 20 to about 120 mesh.

31. A process according to claim 19, wherein the powder is constituted by at least 90% of particles having a size of at least 15 mesh.

32. A process according to claim 31, wherein said particles have a size of at least 30 mesh.

33. A process according to claim 19, wherein said agitation is carried out in order to avoid having stagnant particles of said elastomer in the vessel.

34. A process according to claim 19, wherein said agitation is carried out so as to evenly heat the elastomer from scrap and therefore prevent its degradation.

35. A process according to claim 19, wherein said process has a weight ratio, oil/elastomer from scrap, comprised between 0.03 and 0.2.

36. A process according to claim 35, wherein said ratio is comprised between 0.05 and 0.09.

37. A process according to claim 28, wherein said oil is preheated, prior to admixing, at a temperature $t_2$ being higher or equal to $t_1$.

38. A process according to claim 37, wherein the temperature $t_2$ has a value comprised between $t_1+10$ and $t_1+40°$ C.

39. A process according to claim 19, wherein said oil is selected from the group consisting of synthetic oil, vegetable oil and mixtures thereof.

40. A process according to claim 39, wherein said oil is a synthetic oil selected from the group consisting of aromatic oil, naphtenic oil, paraffinic oil and mixtures thereof.

41. A process according to claim 19, wherein said agitation is maintained during step (c).

42. A process according to claim 19, wherein said agitation is maintained during steps (c) and (d).

43. A process according to claim 19, wherein said process further comprises after step (b) and prior to step (c):
 b') stopping said agitation
 and said agitation is started again in step (c), after the introduction of the oil into said vessel.

44. A process according to claim 19, wherein in step (d), the regenerated elastomer is kept in continuous motion in order to avoid degradation.

45. A process according to claim 19, wherein said process further comprises after step (c) and prior to step (d):
 c') ejecting said regenerated elastomer from said vessel.

46. A process according to claim 45, wherein in step (d), said regenerated elastomer is cooled down to a temperature below 120° C. to prevent its degradation.

47. A process according to claim 19, wherein said process is carried out in the presence of air.

48. A process according to claim 19, wherein said process is carried out under an inert gas atmosphere.

49. A process according to claim 19, wherein the elastomer is a rubber.

50. A process according to claim 49, wherein said rubber is an ethylene propylene diene monomer rubber or a styrene butadiene rubber.

51. A snowmobile track comprising the regenerated elastomer of claim 1, wherein the elastomer is a rubber.

52. A process for converting an elastomer from scrap to a regenerated elastomer which comprises the steps of:
 a) introducing the elastomer from scrap into a vessel;
 b) agitating the elastomer from scrap;
 c) heating the elastomer from scrap to a temperature below a temperature where the elastomer begins to degrade;
 d) introducing an oil into said vessel and admixing together the elastomer from scrap and the oil; and
 e) cooling down the so formed regenerated elastomer, whereby the regenerated elastomer has properties similar to a corresponding virgin elastomer,
said steps (b) and (c) being carried out simultaneously or separately and said steps (c) and (d) being carried out simultaneously or separately,
wherein said elastomer from scrap is heated at a temperature $t_1$ comprised between 50 and 200° C., and wherein said oil is preheated, prior to admixing, at a temperature $t_2$ being higher or equal to $t_1$.

53. A process for converting an elastomer from scrap to a regenerated elastomer which comprises the steps of:
 a) introducing the elastomer from scrap into a vessel;
 b) agitating the elastomer from scrap;
 c) heating the elastomer from scrap to a temperature below a temperature where the elastomer begins to degrade;

d) introducing an oil into said vessel and admixing together the elastomer from scrap and the oil; and
e) cooling down the so formed regenerated elastomer, whereby the regenerated elastomer has properties similar to a corresponding virgin elastomer, wherein said oil is preheated, prior to admixing, at a temperature $t_2$ of about 100 to about 180° C.

* * * * *